US008282382B2

(12) United States Patent
Mazzarolo

(10) Patent No.: US 8,282,382 B2
(45) **Date of Patent: *Oct. 9, 2012**

(54) METHOD OF MANUFACTURING THERMOFORMED PLASTIC ARTICLES AND DRINK CUP LID MADE BY SUCH METHOD

(75) Inventor: Ivonis M. Mazzarolo, Vaudreuil (CA)

(73) Assignee: IVMA Holdings Company, Westmount (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,838

(22) Filed: Oct. 17, 2011

(65) Prior Publication Data

US 2012/0034329 A1 Feb. 9, 2012

Related U.S. Application Data

(63) Continuation of application No. 12/756,244, filed on Apr. 8, 2010, now Pat. No. 8,038,432, which is a continuation of application No. 11/583,529, filed on Oct. 19, 2006, now abandoned, which is a continuation of application No. 10/691,231, filed on Oct. 23, 2003, now Pat. No. 7,175,800, which is a continuation-in-part of application No. 10/207,595, filed on Jul. 29, 2002, now Pat. No. 6,942,832.

(51) Int. Cl.
*B29C 51/10* (2006.01)

(52) U.S. Cl. ..................... 425/388; 425/343; 425/387.1; 425/402; 425/504; 425/540; 101/212; 101/329; 101/348

(58) Field of Classification Search .................... 425/92, 425/302.1, 304, 342.1, 353, 356, 377, 387.1, 425/388, 402, 451, 503, 504, 538, 539, 540, 4 R, 817 R, 122, 145, 150, DIG. 60; 101/35, 101/36, 37, 212, 232, 329, 348
See application file for complete search history.

(56) References Cited

U.S. PATENT DOCUMENTS

| | | | | | |
|---|---|---|---|---|---|
| 3,071,812 | A | * | 1/1963 | Miller | 425/292 |
| 3,259,060 | A | * | 7/1966 | Martin | 101/144 |
| 3,282,202 | A | * | 11/1966 | Groth et al. | 101/37 |
| 3,479,694 | A | * | 11/1969 | Winstead | 425/4 R |
| 3,568,594 | A | * | 3/1971 | Johnston et al. | 101/152 |
| 3,632,252 | A | * | 1/1972 | Amberg et al. | 425/168 |
| 3,668,980 | A | * | 6/1972 | Tone | 493/326 |
| 3,735,697 | A | * | 5/1973 | Provan | 101/37 |
| 3,771,938 | A | * | 11/1973 | Pinto et al. | 425/174.4 |
| 3,779,786 | A | * | 12/1973 | Tone | 427/275 |
| 3,789,095 | A | * | 1/1974 | Winstead | 264/51 |
| 3,827,356 | A | * | 8/1974 | Snow et al. | 101/35 |
| 3,915,087 | A | * | 10/1975 | Tiemann | 101/115 |
| 3,964,237 | A | * | 6/1976 | Johansen | 53/141 |
| 4,121,402 | A | * | 10/1978 | Cress et al. | 53/452 |
| 4,210,481 | A | * | 7/1980 | Wolff et al. | 156/357 |
| 4,235,579 | A | * | 11/1980 | Kurz et al. | 425/174.4 |
| 4,271,757 | A | * | 6/1981 | Maxwell et al. | 101/37 |
| 4,284,396 | A | * | 8/1981 | Thissen et al. | 425/342.1 |
| 4,288,400 | A | * | 9/1981 | Winstead | 264/210.1 |

(Continued)

*Primary Examiner* — Joseph Del Sole
*Assistant Examiner* — Seyed Masoud Malekzadeh
(74) *Attorney, Agent, or Firm* — Carlton Fields, PA; William Giltinan

(57) ABSTRACT

A method and apparatus for vacuum thermoforming disposable drink cups lids. The method and apparatus include the step of imparting printing to the lids in two or more colors. The step of imparting printing to the lids is done while the lids are in contact with the vacuum thermoforming platen.

3 Claims, 5 Drawing Sheets

U.S. PATENT DOCUMENTS

| | | | | | |
|---|---|---|---|---|---|
| 4,384,836 | A | * | 5/1983 | Winstead | 425/145 |
| 4,413,964 | A | * | 11/1983 | Winstead | 425/66 |
| 4,518,096 | A | * | 5/1985 | Winstead | 220/268 |
| 4,519,310 | A | * | 5/1985 | Shimizu et al. | 101/35 |
| 4,563,949 | A | * | 1/1986 | Rogge | 101/174 |
| 4,669,969 | A | * | 6/1987 | Martelli et al. | 425/388 |
| 4,682,942 | A | * | 7/1987 | Gotchel et al. | 425/103 |
| 4,753,059 | A | * | 6/1988 | Natterer | 53/131.5 |
| 4,764,241 | A | * | 8/1988 | Makino | 156/382 |
| 4,830,596 | A | * | 5/1989 | Neu | 425/388 |
| 4,864,927 | A | * | 9/1989 | Niehaus | 101/181 |
| 4,874,456 | A | * | 10/1989 | Takagi | 156/471 |
| 5,010,814 | A | * | 4/1991 | Shishikura | 101/211 |
| 5,193,456 | A | * | 3/1993 | Wolfe et al. | 101/40 |
| 5,423,252 | A | * | 6/1995 | Yamamoto et al. | 101/35 |
| 5,451,157 | A | * | 9/1995 | Gimenez | 425/302.1 |
| 5,492,465 | A | * | 2/1996 | Matuzawa et al. | 425/214 |
| 5,701,815 | A | * | 12/1997 | Bocko et al. | 101/211 |
| 6,286,428 | B1 | * | 9/2001 | Madsen | 101/485 |
| 6,314,876 | B1 | * | 11/2001 | Ackley | 101/44 |
| 6,481,995 | B2 | * | 11/2002 | Delrosario et al. | 425/123 |
| 6,668,721 | B2 | * | 12/2003 | Naka | 101/218 |
| 6,823,794 | B2 | * | 11/2004 | Bosler et al. | 101/488 |
| 6,823,795 | B2 | * | 11/2004 | Willcocks et al. | 101/492 |
| 7,178,571 | B2 | * | 2/2007 | Vergona | 156/353 |
| 7,311,045 | B2 | * | 12/2007 | Ackley et al. | 101/485 |
| 2001/0042455 | A1 | * | 11/2001 | Ackley | 101/35 |
| 2003/0006536 | A1 | * | 1/2003 | Dunlap et al. | 264/509 |

* cited by examiner

METHOD OF MANUFACTURING THERMOFORMED PLASTIC ARTICLES AND DRINK CUP LID MADE BY SUCH METHOD

RELATED APPLICATION

This application is a continuation of U.S. application Ser. No. 12/756,244 filed Apr. 8, 2010, now U.S. Pat. No. 8,038, 432, which is a continuation of U.S. application Ser. No. 11/583,529, filed Oct. 19, 2006, now abandoned, which is a continuation of application Ser. no. 10/691,231, filed Oct. 23, 2003, now U.S. Pat. No. 7,175,800, which is a continuation-in-part of application Ser. No. 10/207,595, filed on Jul. 29, 2002, now U.S. Pat. No. 6,942,832 and claims priority thereto. The content of the U.S. Pat. Ser. Nos. 11/583,529 and 10/691,231 are incorporated herein by reference.

FIELD OF THE INVENTION

This invention relates to the vacuum thermoformed plastic articles and particularly to a vacuum thermoformed disposable drink cup lid having printed indicia thereon and a method of manufacturing such an article.

BACKGROUND OF THE INVENTION

It is well known to manufacture thin plastic articles such as disposable drink cup lids by vacuum thermoforming. Such articles are manufactured by causing a web of extruded plastic sheet material to contact a metal die having the desired shape of the article formed into a surface thereof. Vacuum is applied to the platen surface through small holes to draw the plastic material over the contours of the die. The articles are thereafter cooled, separated from the web by die cutting, and stacked and/or boxed using conventional automation devices.

It is also known to vacuum form logos and other indicia on the plastic lids. Such indicia are typically formed of raised surfaces in a central deck area of the lid. Because thermoformed plastic lids are usually of one color, it is difficult to clearly see such vacuum embossed indicia. To add definition, the raised surfaces of the embossed indicia may be colored in a secondary operation carried out by printing machinery separate from the thermoforming machinery.

BRIEF SUMMARY OF THE INVENTION

According to the present invention, vacuum thermoformed articles such as disposable drink cup lids are thermoformed and printed; i.e., provided with coloring on embossed surfaces and/or printed with logos and other indicia on non-embossed surfaces in what is essentially a single operation. In other words, printing takes place as the article is being thermoformed. The invention increases manufacturing efficiency and lowers manufacturing costs and provides the end user with added value in the form of marketing and promotional indicia.

In general, this is accomplished by extruding a thin web of thermoformable plastic sheet material, contacting the web while hot with a vacuum thermoforming die configured to form articles such as disposable drink cup lids having printable areas within the boundaries of said articles, applying vacuum to form the articles, immediately thereafter applying ink to the printable areas while the articles remain in the web and at an elevated temperature and, thereafter, separating the fully formed and printed articles from the web. As stated above, the term "printed" is used herein to refer to both adding color to embossed surfaces and placing indicia on essentially flat surfaces.

In the preferred form hereinafter described, the method is carried out by means of an apparatus which comprises a rotating thermoforming drum carrying a series of plates with die inserts for forming articles, and a multi-surface rotatable printing cylinder which rotates in synchronism with the thermoforming drum. The printing cylinder rotates in synchronism with the drum and with an Anilox roller which carries ink from a supply to the plates on the printing cylinder. Synchronism is preferably maintained by gears to ensure registration between the ink plates and the thermoformed articles. Fully formed and printed articles thereafter pass to a conventional die cutter where they are removed from the web. The articles may be stacked and excess material from the web returned to the extruder supply hopper.

As described herein, it is possible to print in more than one color on a surface of the article. This is accomplished by providing two or more printing mechanisms in angular spaced relationship to the thermoforming systems, one comprising a printer element which engages a surface of the article at one point in the thermoforming process and another printing element which contacts the article for in-registry printing purposes at another angularly spaced position in the thermoforming process.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENTS

First Embodiment

Figure 1:
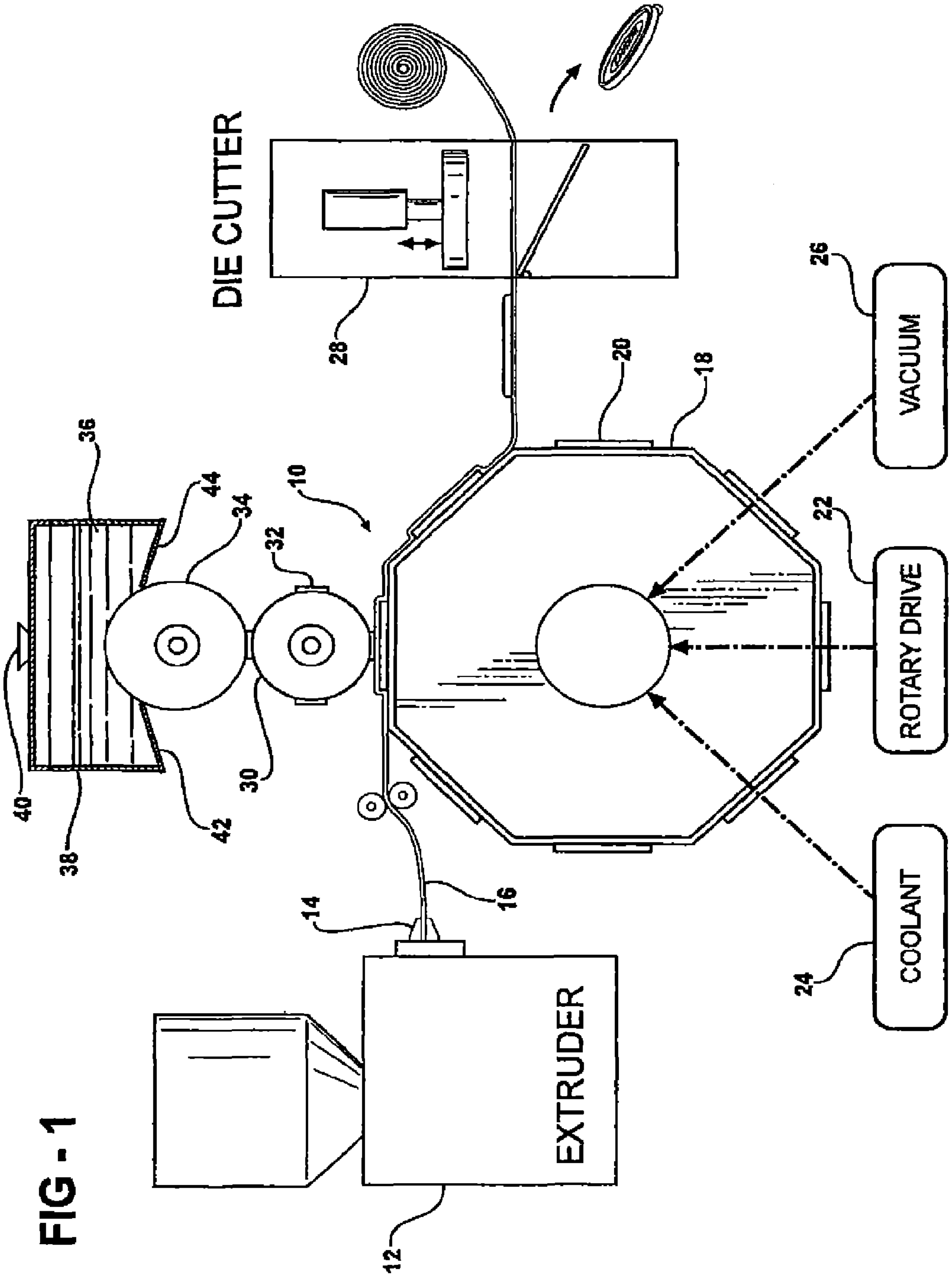
FIG. 1 is a schematic view of a system for carrying out the method of manufacturing disposable drink cup lids.

Referring to the drawing, FIG. 1 illustrates in schematic fashion an apparatus 10 for manufacturing vacuum thermoformed drink cup lids and simultaneously printing the lids in what is essentially a single and continuous manufacturing operation. The apparatus 10 comprises a hot melt extruder 12 for receiving ground or pelletized plastic material such as polystyrene or polyethylene. The extruder is equipped to melt the plastic material and force it through an exit die 14 of convention design to produce a thin web 16 of plastic material. The width of the web may be any desired width; here approximately 24 inches.

The web 16 exits the extruder die 14 at approximately 320° F. to 340° F. and passes to a vacuum forming drum 18 which is suitably mounted for rotation by a drive 22 in either direction to cause the web to contact forming dies 20 mounted on the drum 18 for the desired time. Coolant and vacuum are applied to the drum by sources 24 and 26 respectively to control temperatures and to produce vacuum forming.

After the desired time of contact with the dies 20 on the drum 18 the web 16 with the articles formed therein passes to a die cutter and stacker 28 of conventional design.

To carry out the printing operation simultaneously and in synchronism with the thermoforming operation, a printing cylinder 30 is mounted above the drum 18 by means to be described with reference to FIG. 2. The printing cylinder 30 is equipped with plates 32 which contact the vacuum formed articles after they have cooled to a temperature of between about 150°-250° F., the elevated temperature being effective to rapidly dry the ink which is applied to the vacuum thermoformed articles by the plates 32 on the printing cylinder 30.

The plates 32 on the printing cylinder 30 are continuously inked by an Anilox roller 34 which picks up ink 36 from an ink fountain 38 having a filler mechanism 40. Seals and proper ink distribution are provided by Nylon doctor blade 42 and 44 which form the bottom of the ink fountain 38 and engage the upper quadrant of the Anilox roller 34.

The drum 18, printing cylinder 30 and Anilox roller 34 all rotate in precise synchronism as a result of means hereinafter described in detail with reference to FIG. 2. In addition the printing cylinder 30, Anilox roller 34 and ink fountain 38 adapt for vertical movement by means to be described in order to accommodate the angular surface of the octagonal thermoforming drum 18.

Figure 3:
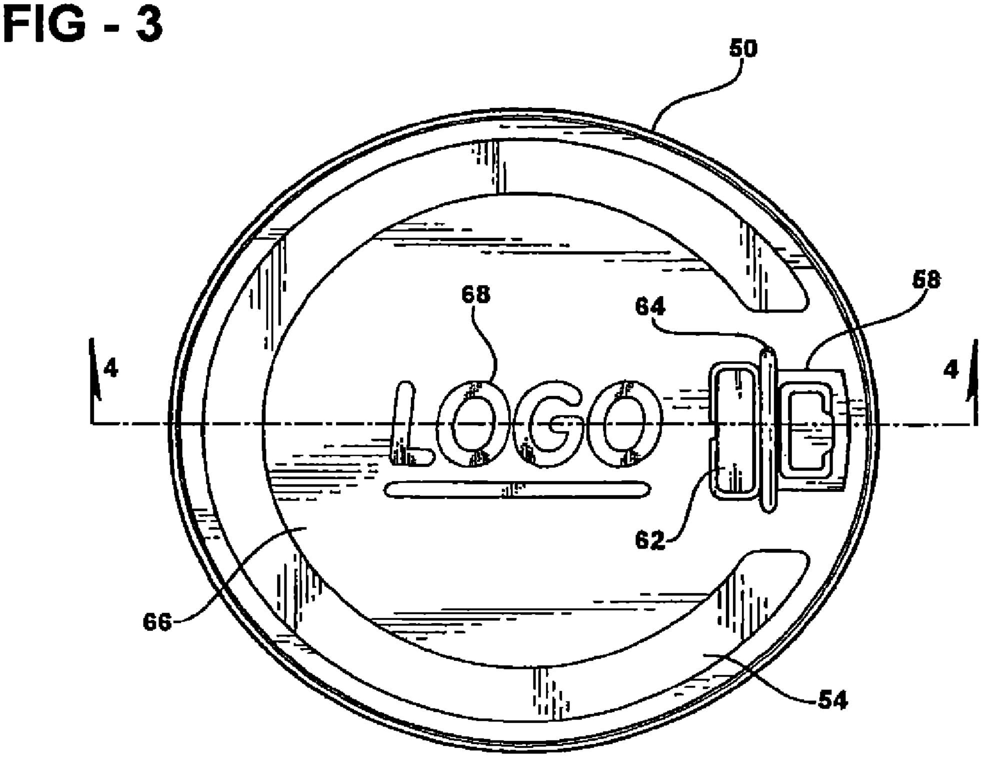
FIG. 3 is a plan view of a drink up lid made by the inventive method.
Figure 4:
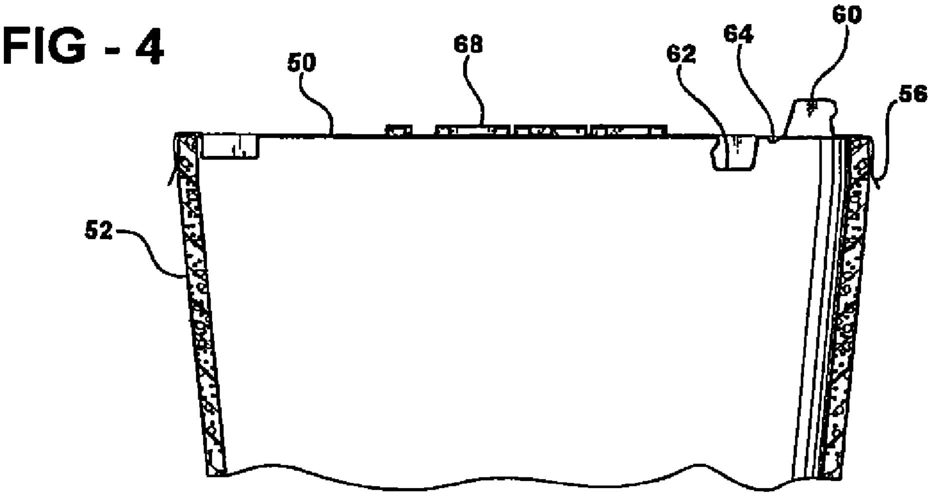
FIG. 4 is a sectional view of the FIG. 3 lid.

Referring now to FIGS. 3 and 4 a specific thermoformed article 50 is shown to comprise a thin plastic drink cup lid of approximately 3 V2 inches in diameter and configured to be applied to the upper rim of a standard plastic or paper disposable drink cup 52. The specific article 50 shown in FIGS. 3 and 4 is a hot drink cup lid producing what is known in the trade as a plug fit by means of a 300° channel 54 which is vacuum thermoformed into the material of the lid 50. A skirt 56 is also vacuum formed around the periphery of the lid and finally formed by the die cutting operation carried out by device 28 shown in FIG. 1.

The lid 50 is shown to comprise a drink-through tear-back tab 58 defined by a partially die cut area near the periphery of the lid and within the discontinuity of the plug fit channel 54. A raised feature 60 is formed in the lid 50 adjacent a shallow hinge 64 such that the raised operating feature 60 may be folded back and locked back into a receiver cavity 62 formed immediately behind the hinge 64. The details of the tear-back/lock-back features of the lid 50 are more fully described in the co-pending application for U.S. patent application Ser. No. 09/952,144 filed Sept. 14, 2001, the entire disclosure of which is incorporated herein by reference.

Figure 5:
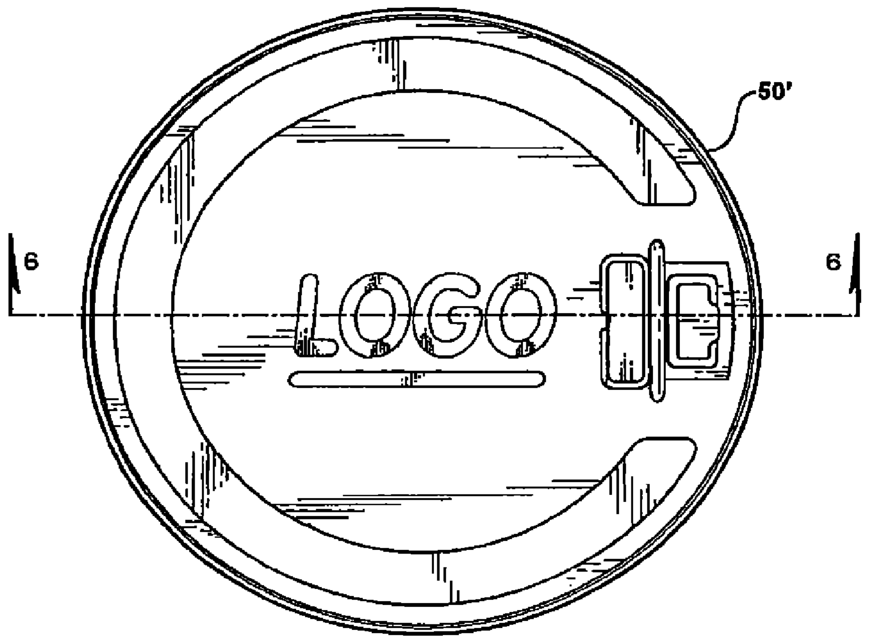
FIG. 5 is a plan view of a second lid made by the inventive method.
Figure 6:
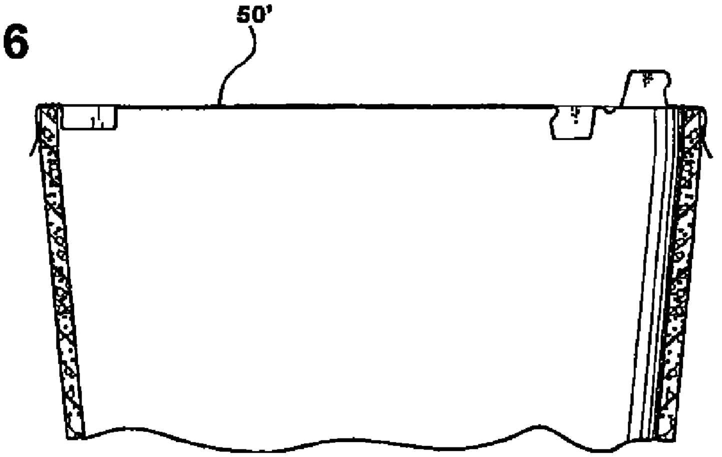
FIG. 6 is a sectional view of the FIG. 5 lid.

The lid 50 is shown to comprise a large flat central deck area 66 in which there is embossed during the thermoforming operation a raised logo 68 the features of which have relatively flat raised surfaces. In accordance with the invention coloring is imparted to the raised surfaces of the logo 68 by the printing cylinder 30 and the apparatus of FIG. 1. FIGS. 5 and 6 illustrate a second lid 50' of a configuration which is slightly different from the configuration of lid 50. Specifically, the lid 50' has no embossed logo. Accordingly, the plates 32 of the printing cylinder 30 must be formed, like conventional rubber stamps, to carry the desired lettering on other indicia.

Figure 2:
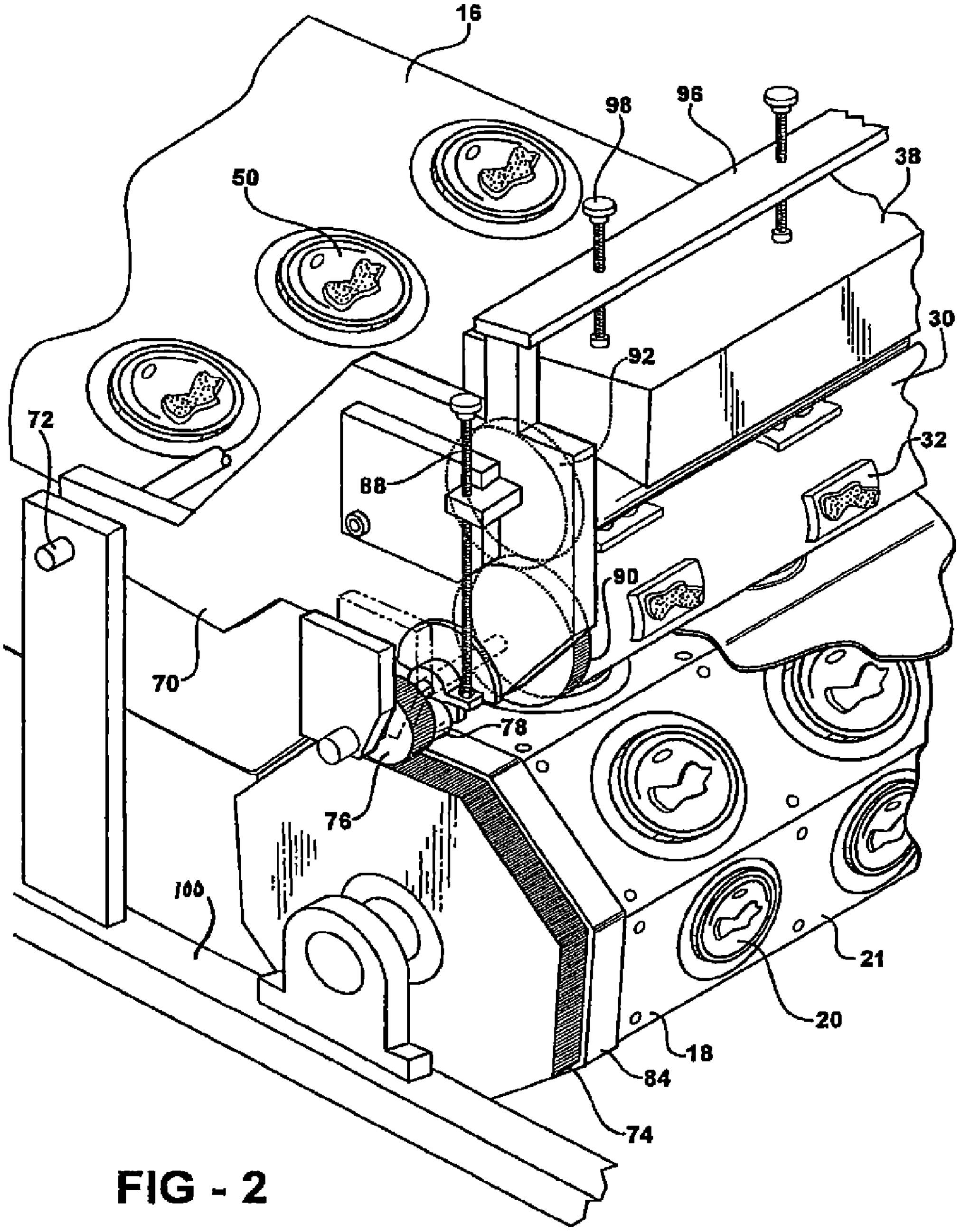
FIG. 2 is a perspective view of a portion of the machine of FIG. 1.

Referring now to FIG. 2, the octagonal drum 18, the printing cylinder 30, the Anilox roller 34 and the ink fountain 38 are shown in greater detail. A continuous gear surface 74 is formed around the left peripheral end of the drum 18 with teeth extending parallel to the axis of rotation of the drum 18. The gear surface 74 is in constant contact with a print cylinder gear 76 which is mechanically attached to the printing cylinder 30 to rotate the printing cylinder 30 and the ink plate 32 in precise synchronism with the rotation of the drum 18 thereby to ensure continuous registry of the ink plate 32 with the locations of the mold inserts or dies 20 which are carried by plates 21 attached by machine screws to the flat surfaces of the drum 18. In this instance there are three lid forming dies 20 across each of the plates 21 but this number is merely illustrative. The molding features of the inserts 20 may differ from insert to insert but it is desirable that all of the inserts be male dies and have essentially the same height so as to be properly engaged by the printing surfaces of the plates 32. The feature 60 shown in FIGS. 3 and 4 of the drawings requires that the ink plates be sized and located to clear the feature 60 as they engage the top surfaces of the logo 68 during the printing operation.

The printing cylinder 30 with the associated gear 76 is mounted on a print head frame 70 which is adapted for pivotal rotation about an axle 72. Cam rollers 78 mounted on both sides of the frame 70 for rotation relative thereto contact cam surfaces 84 formed on the drum 18. The cam surfaces are continuous, and, although essentially octagonal, have machined corners to permit smooth and continuous contact between the cam surfaces and the associated roller 78. The clearance between the rollers 78 and the cam surfaces 84 may be adjusted by means of adjustment screws 88 shown in FIG. 2 to vary the pressure of the ink plates 32 on the molded plastic articles during the printing operation.

To ensure a synchronous drive relationship between the printing cylinder 30 and the Anilox roller 34, the gear 90 is mounted on the printing cylinder 30 inboard of the gear 76 and meshes with a gear 92 mounted on the left end of the Anilox inking roller 34 as shown in FIG. 2. The Anilox roller 34 is mounted on the frame 70 by conventional bearings.

The ink fountain 38 may be adjusted in relationship to the surface of the Anilox roller 34 by means of a plate 96 which lies between opposite lateral sections of the frame 70 and carries spacing adjustment screws 98. The drum 18 is mounted on a frame 100 for rotation as previously described.

OPERATION

In a typical operation plastic material is forced from the extruder through the die 14 to form the hot web 16, the web being continuously drawn from the extrusion die 14 by clockwise rotation of the drum 18. It will be understood that this drum may rotate in the counter-clockwise direction if desired to extend the web 16 around the bottom of the drum and thereafter to the die cutter 28.

Substantially as soon as the web 16 encounters the mold inserts 20 of the drum 18 vacuum is applied and the material of the web is drawn by vacuum over the contours of the dies 20 to form the lids 50 or such other articles as it may be desired in any particular operation to make. The web material cools to between approximately 140° F. to 250° F. for application of the ink 36 by way of the plates 32 on the printing cylinder 30. The web material with the articles now formed therein and printed remains in contact with the drum 18 and the dies 20 and plates 21 long enough to cool to between about 70° F. and 110° F. whereupon they are separated from the drum surface and conveyed to the die cutter apparatus 28.

Extra material from the web not formed into articles 50 may be recovered and ground and returned to the hot melt extruder 12.

MULTI-COLOR EMBODIMENT

Figure 7:
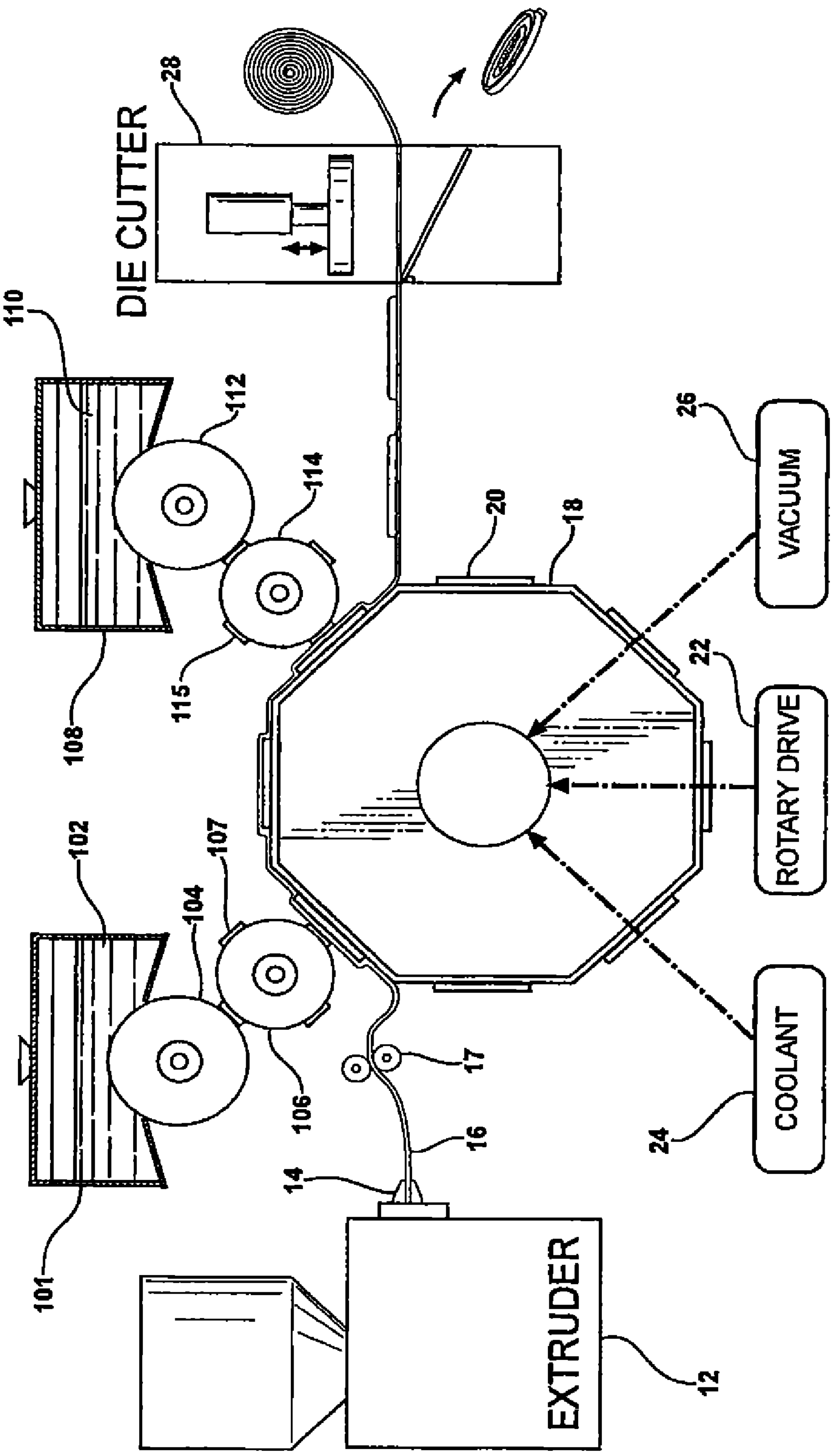
FIG. 7 is a schematic diagram of a system for carrying out the method of manufacturing disposable drink cup lids and printing on said lids in two different colors.

Referring now to FIG. 7, there is shown an apparatus which is similar to the apparatus of FIG. 1 but which provides the capability of printing on the surface of the thermoformed articles in two different colors. Where components of FIG. 7 are identical to the components of FIG. 1, identical reference numerals are used. For example, the extruder 12, the die 14, the web 16, the thermoforming drum 18 with the dies 20, the rotary drive 22, the coolant source 24 and the vacuum source 26 in FIG. 7 are all identical to the corresponding components in FIG. 1. Note that, while an octagonal drum is shown, it is desirable to increase the size of the drum and increase the number of faces to accommodate additional colors.

The apparatus of FIG. 1 further comprises a first ink reservoir 101 filled with ink 102 of a first color such as red which supplies red ink to the Anilox roller 104 which is turn supplies red ink to the plates 107 on the printing roller 106. Printing roller plates 107 contact the web 16 as it overlies a die 20 on the thermoforming drum 18 at a first angular position. The first ink reservoir 101 and associated components are, except for position, identical to the corresponding apparatus shown in FIG. 1.

A second ink reservoir 108 with ink 110 of a second color such as blue contacts a second Anilox roller 112 which loads the ink onto the plates 115 of a second printing roller 114. The plates 115 contact the web 16 at a second angular position on the drum 18 which remains in registry with the printing process carried out at the first position thereby to add a second color to the indicia on the articles. The printed articles then proceed to the die cutter 28 in the fashion described with reference to FIG. 1. The second reservoir 108 and associated components are, except for ink color and position, identical to corresponding components of reservoir 101.

The printing apparatus including the reservoirs 101 and 108 may be mechanically interconnected for servicing convenience and to ensure the maintenance of proper registry between the ink plates and the articles being printed on. The reservoirs, Anilox rollers and printing rollers may also be supported by means which permit them to be lifted and withdrawn individually or in unison from the surface of the web for various purposes which will be apparent to those skilled in the plastic article printing arts.

While the invention has been described with reference to a specific article and a specific apparatus for carrying out the manufacturing method of the article, it is to be understood that it may be carried out using apparatus of different style and design and also that articles other than molded plastic drink cup lids may be manufactured and printed in accordance with the teachings of this patent. While the adjustable cam rollers and gears described above with reference to the illustrative embodiment are preferred at this time, it is to be understood that other and equivalent drive devices such as belts, chains and the like may also be used to synchronize the rotation of the various components of the thermoforming and printing system. Alternatively or additionally a speed control and synchronization may be achieved electronically using high resolution encoders and variable speed motors and the like. A key consideration is to avoid slip between the rotating drum 18 and the inking cylinders as such slip will deregister the plates from the articles 50 being printed.

What is claimed is:

1. Apparatus for vacuum thermoforming and printing plastic articles from a substantially continuous web of thermoformable plastic material comprising:

a rotatable vacuum thermoforming drum for receiving said web and having a continuum of thermoforming dies defining said articles arranged circumferentially thereon;

a vacuum source associated with said drum;

means for providing a web of thermoformable plastic material at a first elevated temperature to said drum;

means for rotating said drum to cause said web to wrap partly around said drum and contact said dies while applying vacuum from said source to said dies;

a printing structure carrying a printing plate and being disposed immediately adjacent said drum at respective, circumferentially spaced locations for contacting and imparting ink to plastic articles immediately after said articles are formed in said web over said dies and while remaining on said dies at a second elevated temperature; and means for operating said printing structure in synchronism with the rotation of said drum.

2. Apparatus of claim 1 wherein said means for operating said printing structure in synchronism comprises a plurality of gears and at least one cam.

3. Apparatus of claim 1 wherein said means for operating said printing structure in synchronism comprises an electronic control circuit adapted to separately control the rotation speed of said drum and the rotation speed of said printing structure.

* * * * *